(12) United States Patent
Jebran et al.

(10) Patent No.: US 10,331,148 B2
(45) Date of Patent: Jun. 25, 2019

(54) WATER TEMPERING SYSTEM

(71) Applicant: 2397593 ONTARIO INC., Etobicoke (CA)

(72) Inventors: Nassim Jebran, Mississauga (CA);
Louie Mazzullo, Kleinburg (CA);
Frank Mazzullo, Woodbridge (CA);
Bernard Baskovic, Mississauga (CA)

(73) Assignee: 2397593 ONTARIO INC., Etobicoke (CA)

( * ) Notice: Subject to any disclaimer, the term of this patent is extended or adjusted under 35 U.S.C. 154(b) by 329 days.

(21) Appl. No.: 15/352,790

(22) Filed: Nov. 16, 2016

(65) Prior Publication Data

US 2017/0060148 A1 Mar. 2, 2017

Related U.S. Application Data

(63) Continuation-in-part of application No. 14/446,674, filed on Jul. 30, 2014, now abandoned.

(60) Provisional application No. 61/910,174, filed on Nov. 29, 2013, provisional application No. 61/859,948, filed on Jul. 30, 2013.

(51) Int. Cl.
| | |
|---|---|
| *F17D 3/01* | (2006.01) |
| *G05D 23/13* | (2006.01) |
| *E03B 7/07* | (2006.01) |

(52) U.S. Cl.
CPC ........... *G05D 23/1353* (2013.01); *E03B 7/07* (2013.01); *F17D 3/01* (2013.01); *Y10T 137/6497* (2015.04); *Y10T 137/85986* (2015.04)

(58) Field of Classification Search
CPC .............. G05D 23/1353; F17D 3/01; Y10T 137/85986; Y10T 137/6497; E03B 7/04; E03B 7/071; E03C 1/041; F24D 3/1091; F24D 17/0073
See application file for complete search history.

(56) References Cited

U.S. PATENT DOCUMENTS

| | | | |
|---|---|---|---|
| 1,545,938 A | 7/1925 | Bren |
| 2,245,967 A | 6/1941 | Dillon |
| 3,007,470 A | 11/1961 | Heeger |
| 3,666,918 A | 5/1972 | Clark, Jr. et al. |

(Continued)

OTHER PUBLICATIONS

USPTO Office Action dated Nov. 30, 2016 in U.S. Appl. No. 14/446,674.

*Primary Examiner* — Robert K Arundale
*Assistant Examiner* — Jonathan J Waddy
(74) *Attorney, Agent, or Firm* — Marshall & Melhorn, LLC

(57) ABSTRACT

A water tempering system comprising a mixing tank located downstream from the main hot water storage tank, the mixing tank receiving a supply of hot water at a first temperature and a supply of cold water, the hot water and cold water supplies mixing within the mixing tank to provide a source of tempered hot water at a reduced, second temperature that is discharged from the mixing tank for distribution and use within an overall system. The amount of cold water directed to the mixing tank is controlled by a variable frequency drive pump which can adjust depending on system demands to ensure that sufficient cold water is directed to the mixing tank to ensure adequate mixing occurs to bring the temperature of the hot water to the second reduced temperature even during periods of low demand.

15 Claims, 8 Drawing Sheets

(56) References Cited

U.S. PATENT DOCUMENTS

| | | | |
|---|---|---|---|
| 3,688,839 | A | 9/1972 | Kirschner |
| 5,056,712 | A | 10/1991 | Enck |
| 7,475,827 | B2 | 1/2009 | Schmitt |
| 8,467,910 | B1 | 6/2013 | Kumar |
| 2004/0154094 | A1* | 8/2004 | Ostrowski .......... A61H 33/0087 4/541.1 |
| 2005/0183773 | A1 | 8/2005 | Sinclaire |
| 2006/0054566 | A1 | 3/2006 | Ramirez et al. |
| 2007/0170273 | A1 | 7/2007 | McIllwain |
| 2008/0173357 | A1 | 7/2008 | Acker |
| 2008/0251373 | A1* | 10/2008 | Oke ........................ A61L 2/035 203/11 |
| 2009/0321335 | A1* | 12/2009 | Siemer ................... C02F 9/005 210/175 |
| 2010/0122669 | A1 | 5/2010 | Hughes |
| 2016/0341445 | A1* | 11/2016 | Deivasigamani ......... F24H 1/08 |

* cited by examiner

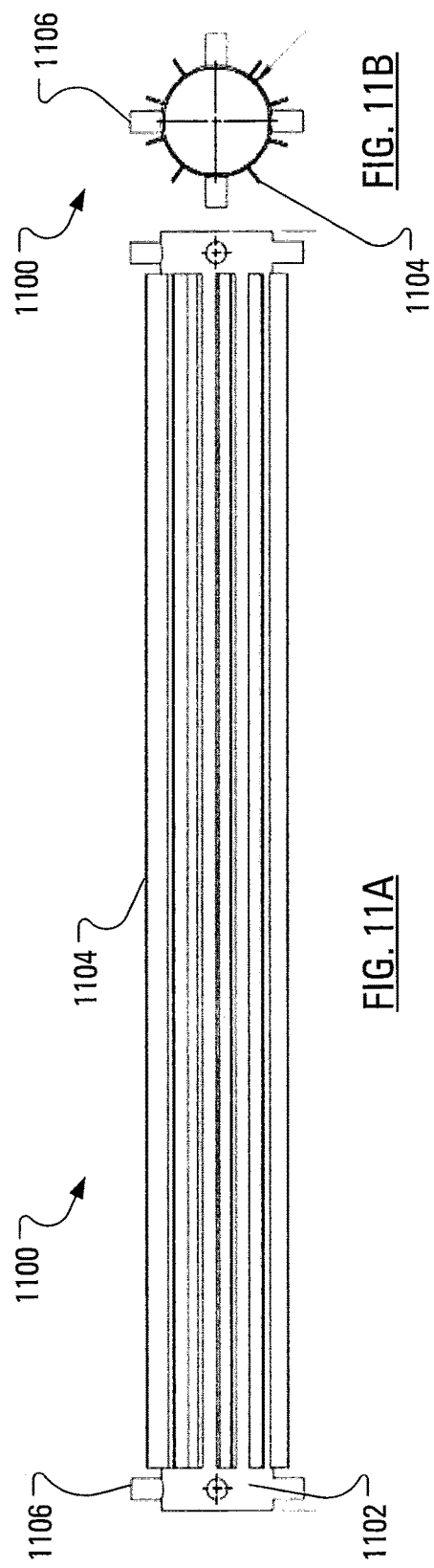

WATER TEMPERING SYSTEM

CROSS-REFERENCE TO RELATED APPLICATIONS

This application is a continuation-in-part of U.S. patent application Ser. No. 14/446,674, filed Jul. 30, 2014 and currently pending. U.S. patent application Ser. No. 14/446,674 claims priority to and the benefit of U.S. Provisional Patent Application No. 61/859,948 filed Jul. 30, 2013 and U.S. Provisional Patent Application No. 61/910,174 filed Nov. 29, 2013. The content of the above-noted provisional patent applications are hereby expressly incorporated by reference into the detailed description of the present application.

TECHNICAL FIELD

The invention relates primarily to a water tempering system. In particular, the invention relates to a water tempering system for the domestic hot water supply for incorporation into the overall water distribution system of buildings, the overall water distribution system containing a recirculation line.

BACKGROUND

In general, building code guidelines for high rise condominium or apartment buildings, for example, require that domestic hot water enter the individual units or suites at a specific temperature in order to avoid potential scalding. For example, building codes may require that the water enter the units or suites at a temperature less than or equal to 125° Fahrenheit. However, to avoid the accumulation of harmful bacteria within the domestic hot water supply when the water is stagnant within a storage tank, building codes typically require that water be kept at a minimum temperature of at least 140° Fahrenheit. Accordingly, the domestic hot water supply requires tempering between the storage tank where the hot water is stored and upon entering the individual units or suites in order to bring the hot water to the required, usable temperature in accordance with known guidelines.

Domestic hot water distribution systems are known wherein the domestic hot water is tempered mechanically using an anti-scalding mixing valve. Typically, the anti-scalding mixing valve is an electronic mixing valve having two inlets, one for domestic hot water and one for domestic cold water, and one outlet for the tempered water. The mixing valve can be set, by means of a control system, based on the inlet temperatures of both the domestic hot water and the domestic cold water to ensure appropriate mixing of the domestic hot water supply and the domestic cold water supply to bring the temperature of the domestic hot water that is delivered to the individual units/suites, etc. to the required temperature, e.g., 120-125° Fahrenheit.

Typical anti-scalding mixing valves, however, have a minimum flow requirement in order for accurate mixing to occur. Therefore, the typical anti-scalding mixing valve requires that a certain flow rate be maintained through the system in order to ensure appropriate functioning of the mixing valve and the overall water tempering system. However, during periods of low usage or low demand on the water supply, for example, during the overnight period, the main circulator pumps, which pump the hot and cold water through the overall water distribution system, are turned off or are not in use for energy saving purposes and a recirculation pump is often used to run hot water through the building. Very often, the pump rate of the recirculation pump is lower than the minimum flow rate required for the proper functioning of the anti-scalding mixing valve to ensure accurate mixing. Accordingly, during periods of low usage there is a risk that accurate mixing and accurate tempering of the domestic hot water will not occur, raising the risk associated with possible scalding. Furthermore, reduced flow through typical anti-scalding mixing valves tends to cause calcium build-up within the valve causing the valve to cease or fail, which cessation or failure further increases the risk of scalding due to the tendency of the anti-scalding mixing valves to malfunction or fail. Therefore, it has been found that the tendency for anti-scalding mixing valves to malfunction or fail due to improper mixing resulting from reduced flow rates through the valves and/or calcium build-up, increases the overall service and maintenance requirements of typical or standard watering tempering systems that are often found in high-rise buildings.

Accordingly, there is a need for improved water tempering systems or improved temperature control for water distribution systems that not only improves performance and reliability but that also is more cost effective.

SUMMARY OF THE PRESENT DISCLOSURE

In accordance with an exemplary embodiment of the present disclosure there is provided a water tempering system comprising a mixing tank having a first inlet for receiving fluid from a first water supply line at a first temperature, a second inlet for receiving fluid from a second water supply line, and a first outlet for discharging fluid from the mixing tank and delivering the fluid via a third water supply line at a predetermined second temperature; a variable frequency drive pump fluidly coupled to the second inlet for controlling the flow of fluid to the mixing tank through the second inlet; a control valve arranged in fluid communication with the variable frequency drive pump for controlling flow to the variable frequency drive pump; a control system for receiving temperature data associated with at least the third water supply line and transmitting said data for operably adjusting said variable frequency drive pump and said control valve to one of a set of predetermined operating conditions.

In accordance with another exemplary embodiment of the present disclosure there is provided a water tempering system comprising a first water supply line for supplying hot water at a first temperature; a second water supply line for supplying cold water; a third water supply line for delivering hot water at a second temperature from said water tempering system for use elsewhere in an overall water distribution system; a mixing tank having a first inlet in fluid communication with said first water supply line for receiving hot water at said first temperature, a second inlet in communication with said second water supply line for receiving cold water, and an outlet in fluid communication with said third water supply line for discharging hot water from said mixing tank at said second temperature; a variable frequency drive pump fluidly coupled to said second water supply line for controlling the flow of cold water to said second inlet of said mixing tank; and a control system for receiving data from at least said third water supply line and transmitting said data to said variable frequency drive pump.

In accordance with a further aspect of the present disclosure there is provided a water tempering system. The water tempering system includes a mixing tank, a pump, an electrically operated valve and a control system. The mixing tank has a first inlet for receiving fluid from a first water supply line at a first temperature, a second inlet for receiving fluid from a second water supply line, a first outlet for discharging fluid from the mixing tank and delivering the fluid via a third water supply line at a second temperature and a recirculation inlet for receiving fluid from a fourth water supply line, the fourth water supply line providing fluid formerly discharged from the mixing tank. The pump fluidly is coupled to the second inlet for controlling the flow of fluid from the second water supply line to the mixing tank through the second inlet. The electrically operated valve is arranged in fluid communication with the pump for controlling flow to the pump. The control system is adapted to receive temperature data associated with the fluid in the mixing tank, analyze the temperature data and based on the analyzing, transmit instructions to the pump causing the pump to alter a flow rate of the fluid from the second water supply line into the second inlet; and transmit instructions to the electrically operated valve causing the electrically operated valve alter the flow rate of the fluid from the second water supply line into the second inlet.

In accordance with a still further aspect of the present disclosure, there is provided a water tempering system. The water tempering system includes a first water supply line for supplying hot water at a first temperature, a second water supply line for supplying cold water and a third water supply line for delivering hot water at a second temperature from the water tempering system for use elsewhere in an overall water distribution system. The water tempering system further includes a mixing tank having a first inlet in fluid communication with the first water supply line for receiving hot water at the first temperature, a second inlet in communication with the second water supply line for receiving the cold water, and an outlet in fluid communication with the third water supply line for discharging hot water from the mixing tank at the second temperature. The water tempering system also includes a pump fluidly coupled to the second water supply line for controlling the flow of cold water from the second water supply line to the second inlet of the mixing tank and an electrically operated valve. The electrically operated valve is adapted to receive temperature data from a temperature sensor mounted to sense temperature within the mixing tank and transmit, based on the temperature data, instructions to the pump to alter a flow rate of the cold water from the second water supply line into the second inlet.

BRIEF DESCRIPTION OF THE DRAWINGS

Exemplary embodiments of the present disclosure will now be described by way of example with reference to the accompanying drawings, in which:

FIG. 11A illustrates, in side view, a blending insert for use inside the mixing tank of FIG. 9 in accordance with aspects of the present disclosure; and FIG. 11B illustrates, in end view, the blending insert of FIG. 11A in accordance with aspects of the present disclosure.

Similar reference numerals may have been used in different figures to denote similar components.

DETAILED DESCRIPTION OF EXAMPLE EMBODIMENTS

Reference will now be made in detail to exemplary implementations of the technology. The example embodiments are provided by way of explanation of the technology only and not as a limitation of the technology. It will be apparent to those skilled in the art that various modifications and variations can be made in the present technology. Thus, it is intended that the present technology cover such modifications and variations that come within the scope of the present technology.

Figure 1:
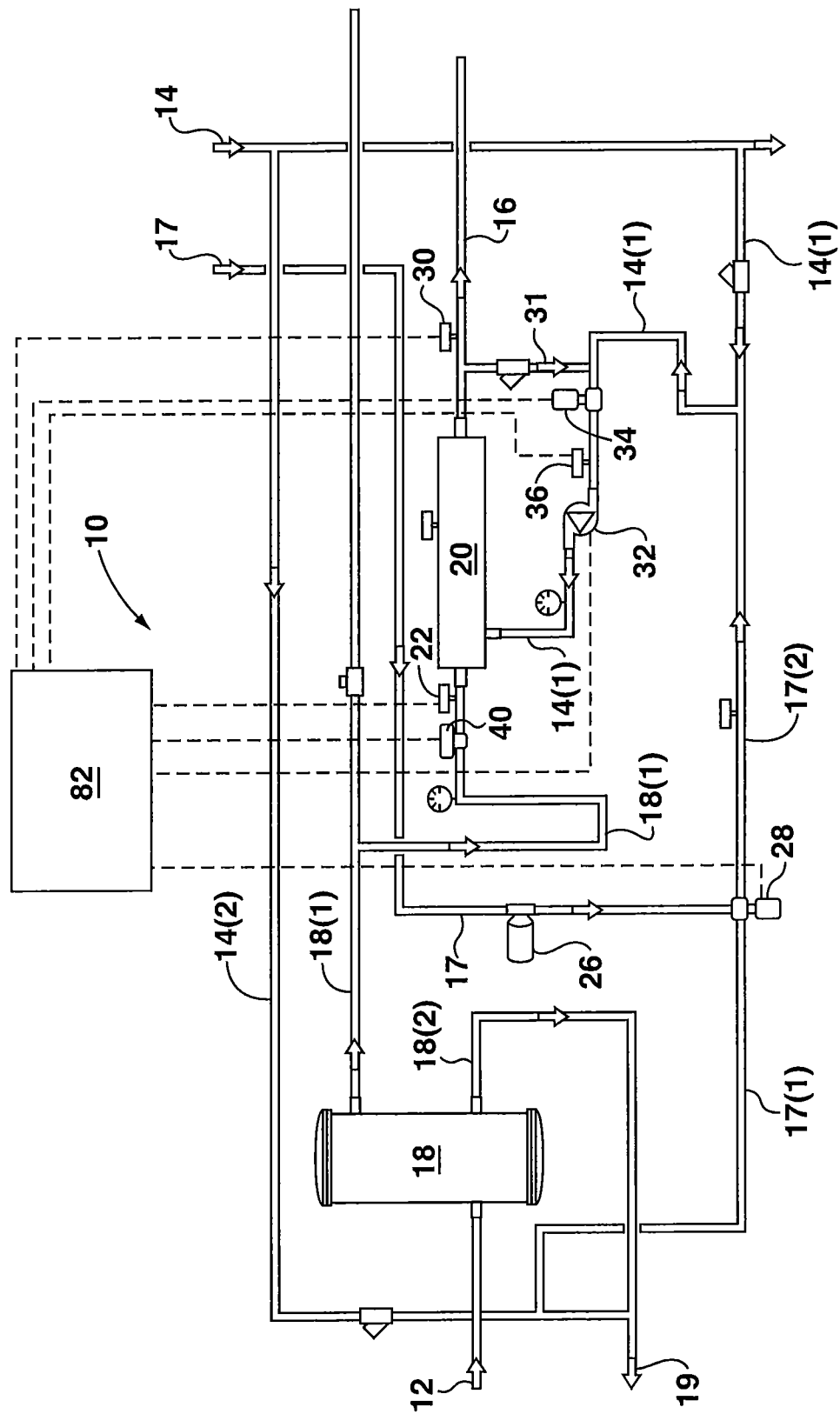
FIG. 1 is a schematic flow diagram illustrating an exemplary embodiment of the water tempering system according to the present disclosure.

Referring now to FIG. 1 there is shown an exemplary embodiment of a water tempering system 10 according to the present disclosure. The water tempering system 10 is particularly designed for use in domestic hot water supply systems for high-rise buildings such as condominiums or apartment buildings in order to provide tempered hot water via a discharge water line or outflow fluid line at a selected and/or predetermined temperature so as to avoid potential risks/dangers associated with burns that can occur when excessive quantities of hot water are inadvertently delivered at the outflow. However, it will be understood that the water tempering system 10 is applicable to other water tempering applications and should not necessarily be limited to domestic hot water supply systems for high-rise buildings. It will be also understood that aspects of the present application apply well to systems containing a building recirculation loop.

Referring now to FIG. 1, it will be understood that the water tempering system 10 is intended to be incorporated into the overall domestic hot water supply system of, typically, but not limited to, a high-rise building. The overall domestic hot water supply system generally comprises one or more boilers (not shown) that serve to heat the water within the domestic hot water supply to a first temperature, for example 140° Fahrenheit. Water at the first temperature is, therefore, delivered or supplied to the water tempering system 10 through a first water supply line or a domestic hot water (DHW) supply line 12. The water tempering system further comprises a second water supply line or a domestic cold water (DCW) supply line 14 that delivers cold water to the water tempering system 10 and a third water supply line or a tempered water outflow line 16 where the domestic hot water that has been tempered to the appropriate temperature is delivered for use within the building or overall system. The overall domestic hot water supply system also comprises a recirculation line 17 that re-circulates spent water through the overall water distribution system and/or circulates water through the overall water distribution system during periods of low usage when the main or primary pumps are not in use. In general, recirculation line 17 directs water back to the one or more boilers for heating through a return line 19.

As shown in FIG. 1, the hot water from the boilers is delivered to a storage tank 18 via the first or domestic hot water supply line 12, the storage tank 18 storing the domestic hot water at the first temperature, in accordance with building code guidelines, for ensuring water safety and/or preventing the accumulation of bacteria (e.g., known bacteria responsible for Legionnaires disease) within the stored water. Water is directed to the boilers for heating and to the storage tank 18 by means of any appropriate pumping arrangement or system of pumps (not shown) in accordance with known principles.

From the storage tank 18, the domestic hot water (DHW) leaves the storage tank 18 at the first temperature (e.g., 140° F.) through a first fluid supply line 18(1) and is directed towards a mixing tank 20. The temperature of the DHW entering the mixing tank 20 is sensed by a first temperature sensor 22, which is in fluid communication with the DHW in the first fluid supply line 18(1). The temperature data obtained by the first temperature sensor 22 is sent to a main control panel 82, which collects the temperature data and transmits corresponding data to components of the water tempering system 10 (and/or components of the overall water distribution system) for operably adjusting the components of the water tempering system 10 based on a set of predetermined operating conditions. In some embodiments, hot water also exits the storage tank 18 through a second fluid supply line 18(2), which is fluidly connected to return line 19 for directing water from storage tank 18 back to the boilers (not shown).

Cold water is delivered to the water tempering system 10 through the second or cold water supply line 14. From the cold water supply line 14 there is a first branch 14(1) that directs cold water to mixing tank 20 and a second branch 14(2) that is fluidly connected to return line 19 for directing cold water to the boilers for heating.

In the subject embodiment, recirculation line 17 has a first branch or first fluid return line 17(1) that directs re-circulated or spent water back to the boilers through return line 19 and a second branch or second fluid return line 17(2) that directs some of the water from the recirculation line 17 back into the cold water supply 14 through an interconnection with the first branch 14(1) of the cold water supply line 14 that directs cold water to the mixing tank 20. A recirculation pump 26 is mounted within recirculation line 17 and serves to "push" water through the overall hot water distribution system, in accordance with known principles, and may also serve to "push" water through the water tempering system 10 during periods of low usage when the main pumps (not shown) that normally operate within the overall water distribution system are typically shut-off or are only running at reduced capacity for energy saving purposes. In order to control the interconnection between the recirculation line 17 and the water tempering system 10, a three-way control valve 28 is incorporated into the water tempering system 10 at the junction of recirculation line 17 and the first and second fluid return lines 17(1), 17(2) for controlling the amount of fluid being directed through the first and second fluid return lines 17(1), 17(2) of the recirculation line 17. Accordingly, three-way control valve 28 is arranged at the junction of fluid line 17, 17(1) and 17(2), as shown in FIG. 1, with recirculation line 17 effectively interconnecting the domestic hot water supply (DWH) to the domestic cold water supply (DCW). In operation, three-way control valve 28 serves to divert some of the water in the recirculation line 17 to the first branch 14(1) of the cold water supply line 14 through second fluid return line 17(2), although the majority of flow is directed through the three-way control valve 28 and through first fluid return line 17(1) back to the boilers (not shown) via return line 19. Generally, the recirculation pump 26 and the three-way control valve 28 are controlled and/or preprogrammed through the main control panel 82 based on predetermined operating conditions.

The water tempering system 10 will now be described in further detail. As described above, the domestic hot water (DHW) leaves the storage tank 18 at the first temperature (e.g., 140° F.) through first fluid supply line 18(1) and is directed towards mixing tank 20, the temperature of the DHW entering the mixing tank 20 being sensed by first temperature sensor 22. Domestic hot water (DHW) leaves the mixing tank 20 through the third fluid supply line or tempered water outflow line 16 and is then directed to the individual suites or units for use by a user. The temperature of the tempered domestic hot water leaving the mixing tank 20 through the outflow or third water supply line 16 is sensed by a second temperature sensor 30. The second temperature sensor 30 monitors the temperature of the DHW in the discharge or outflow line 16 to ensure that the DHW is at the required temperature for safe usage within the building or overall system, for example the required 120-125° Fahrenheit. The temperature data from the second temperature sensor 30 is sent to the main control panel 82, which data is used to operably adjust the water tempering system 10 as need to ensure that the system is functioning appropriately to deliver hot water through the outflow or third water supply at a safe, usable temperature.

In order to bring the temperature of the DHW entering the mixing tank 20 down from the first temperature (e.g., approximately 140° F.) to the second, lower temperature (e.g., 120-125° F.) as it exits or leaves the mixing tank 20 through outflow line 16, domestic cold water (DCW) is directed into the mixing tank 20 through the first branch 14(1) of the cold water supply line 14, the amount of flow through the first branch 14(1) of the cold water supply line 14 into the mixing tank 20 being controlled by means of a variable frequency drive (VFD) pump 32 and a two-way control valve 34 based on temperature data collected associated with at least the temperature of the water in the outflow or third water supply line 16. The domestic cold water that is directed into mixing tank 20 through the first branch 14(1) of the cold water supply line 14 serves to temper or cool the domestic hot water (DHW) entering the mixing tank 20 in order to bring the temperature of the DHW from the first, higher temperature (e.g., 140° Fahrenheit) to the second, lower temperature (e.g., 120° Fahrenheit) so that the water can be safely discharged from the mixing tank 20 through the outflow or third water supply line 16.

A third temperature sensor 36 may also be incorporated into the first branch 14(1) of the cold water supply line 14 intermediate the two-way control valve 34 and the VFD pump 32 in order to sense the temperature of the cold water within the first branch 14(1) of the cold water supply line 14 that is being delivered to the mixing tank 20. In such instances, the temperature data collected by temperature sensor 36 is also sent to the main control panel 82. The temperature data from the various temperature sensors 22, 30, 36 incorporated into the water tempering system 10 (and/or the overall water distribution system) can all be used to operably adjust and/or adapt the water tempering system 10 by means of the main control panel so as to either increase or decrease the amount of cold water (DCW) that is directed through the first branch 14(1) of the cold water supply line 14 into mixing tank 20 to ensure that the water discharged through the tempered water outflow line 16 is at the required safe and usable lower second temperature (e.g., 120-125° F.). Therefore, while the temperature of all three fluid streams (e.g., the domestic hot water from first fluid supply line 18(1), the domestic cold water in the first branch 14(1) of the cold water supply line 14 and the tempered water being discharged through the outflow or third water supply line 16) may be monitored, it is the temperature of the water/fluid in the outflow or third fluid supply line 16 that is the controlling temperature since it dictates whether more or less cold water is needed to effectively temper the hot water supply to an appropriate temperature or safe temperature range.

As shown in FIG. 1, the water tempering system 10 further comprises fluid line 31 that interconnects the tempered water outflow of third water supply line 16 to the domestic cold water of the first branch 14(1) of the cold water supply line 14. Fluid line 31 serves to re-circulate or re-direct tempered water exiting the mixing tank 20 back into the mixing tank 20 through the first branch 14(1) of the cold water supply line 14 in order to maintain or adjust the temperature of the water within the mixing tank 20 based on system requirements or based on temperature data collected by one or more of the various temperature sensors 22, 30, 36 through the main control panel 82. Any suitable control or check valve may also be incorporated into fluid line 31 in order to provide further control over the amount of flow directed through fluid line 31 back into the mixing tank 20.

Variable frequency drive pumps are available in a variety of flow ranges. Therefore, depending upon the specific flow rates required for a particular building system, or for a particular water tempering application, the VFD pump 32 will be selected in accordance with known principles. Typically, a VFD pump with an operating range of 5-40 GPM (gallons per minute) will be suitable for use in the subject water tempering system 10. During periods of low demand or low usage, such as during the overnight period, the VFD pump 32 will be running on minimum speed or will be turned off and overall system pressure drives cold water into the mixing tank 20 with the two-way control valve 34 limiting/controlling the amount of DCW that can enter the mixing tank 20 through the first branch 14(1) of the cold water supply line 14. The VFD pump and the two-way control valve 34 are controlled through the main control panel 82.

In order to ensure that hot water does not leave the water tempering system 10 through the tempered water outflow line or third water supply line 16 at a temperature that exceeds the predetermined safe, usable second temperature (e.g., 120-125° F.), a safety valve 40 may be incorporated into the domestic hot water mixing tank inflow line or first fluid supply line 18(1). The safety valve 40 functions as an emergency shut-off to the domestic hot water (DHW) entering the mixing tank 20 should the temperature of the domestic hot water being discharged from the mixing tank in the tempered water outflow or third fluid supply line 16 exceed the predetermined, second temperature (e.g., 120-125° F.). The safety valve 40 is preferably an electronically controlled valve, such as a slow closing solenoid valve having a first, normally closed or first position that allows domestic hot water to enter the mixing tank 20 at the first temperature (i.e., the temperature of the water in the storage tank 18) through first fluid supply line 18(1). Should the temperature of the hot water in the tempered water outflow of third fluid supply line 16 be found to exceed the predetermined, second temperature, the solenoid or safety valve 40 will activate causing the safety valve 40 to assume its second or activated position effectively shutting-off the domestic hot water being supplied to the mixing tank 20 through first fluid supply line 18(1). When the safety valve 40 is activated, only domestic cold water (DCW) is allowed to enter mixing tank 20 and is supplied to the individual suites/units in an effort to ensure that hot water is not discharged from the water tempering system 10 at a temperature that exceeds a predetermined, safe temperature or temperature range.

Figure 2:
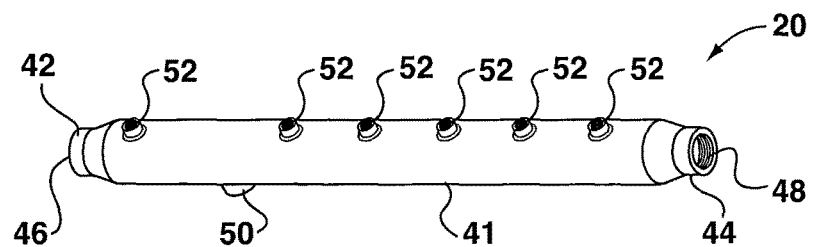
FIG. 2 is a perspective view of a mixing tank that forms part of the water tempering system shown in FIG. 1.

Referring now to FIG. 2, the mixing tank 20 for use in the water tempering system 10 is shown in further detail. As shown, mixing tank 20 is generally an elongated tank having a main body portion 41 with first and second opposed ends 42, 44. The first end 42 incorporates a first fluid inlet 46 for receiving domestic hot water (DHW) from the storage tank 18 through the domestic hot water first fluid supply line 18(1). The second end 44 incorporates a fluid outlet 48 for discharging tempered water from the mixing tank 20 at the second, reduced temperature through the tempered water outflow or discharge line 16. A second fluid inlet 50 is formed in the main body portion 41 of the tank 32 proximal to the first end 42 for receiving domestic cold water from the first branch 14(1) of the cold water supply line 14. In the illustrated embodiment, the second fluid inlet 50 is shown as being located in the bottom surface or lower portion of the main body portion 41 of the mixing tank 20 spaced apart from or positioned slightly downstream from the first inlet 46 formed in the first end 42 of the mixing tank 20 although it will be understood that the exact positioning of the second inlet 50 with respect to the first inlet 46 may vary depending on the particular requirements of the water tempering system 10 for a specific application.

The first end 42 and the second end 44 of the mixing tank 20 each have reduced outer diameters as compared to the outer diameter of the main body portion 41 of the mixing tank 20. Accordingly, as shown in the example embodiment of FIG. 2, the first and second ends 42, 44 of the mixing tank 20 are in the form of tapered ends. The tapering of the first and second ends 42, 44 from the larger diameter main body portion 41 to the smaller diameter first inlet and outlet openings 46, 48 serves to increase turbulence within fluid entering the mixing tank 20 as it flows to the outlet end 44 to ensure that adequate mixing occurs before the water is discharged from the mixing tank 20 through the outlet 48. Adequate mixing of the domestic hot water entering the mixing tank at the first temperature and the domestic cold water entering the tank is required in order to bring the temperature of the domestic hot water to the reduced, second temperature prior to the water being discharged from the mixing tank through the outlet 48 and tempered water outflow line 16.

Figure 3:
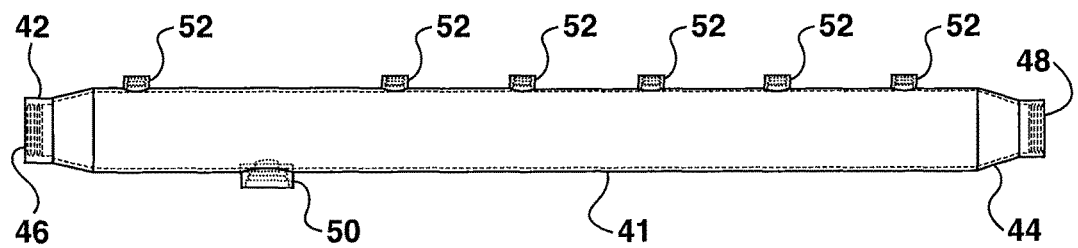
FIG. 3 is a side elevation view of a the mixing tank of FIG. 2.
Figure 4:
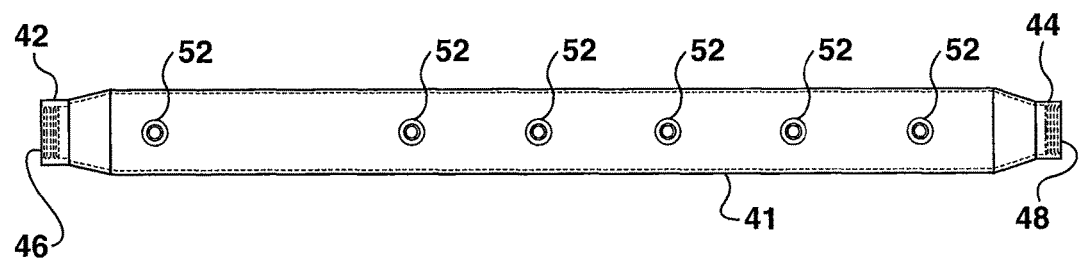
FIG. 4 is a top plan view of the mixing tank of FIG. 2.

The mixing tank 20 may also be provided with a plurality of openings 52 formed at spaced apart intervals along the length of the main body portion 41 of the mixing tank 20. Referring now to FIGS. 2-4, in the illustrated embodiment the plurality of openings 52 are arranged on the upper surface or upper portion of the main body portion 41 between the first and second ends 44, 46 of the tank 20, although it will be understood that they may be located or positioned elsewhere in the main body portion 41 of the mixing tank 20 based on the particular need or application. The openings 52 are typically fitted with lengths of female iron pipe (FIP), which are internally threaded for receiving a corresponding, male component equipped various data collection devices such as temperature sensors or pressure sensors that are incorporated into the mixing tank 20 for collecting additional temperature and/or pressure data from within the mixing tank 20 for assessing the flow dynamics and the fluid mixing within the tank 20. The data is primarily collected for testing purposes at initial setup of the water tempering system 10 to ensure that the water tempering system is functioning properly for a particular application and that adequate mixing is occurring to ensure that hot water is delivered at the required second temperature when exiting the mixing tank 20 to meet the specific building code or application requirements. The additional data collection devices, i.e., various temperature sensors and/or pressure sensors, that are fitted within the various openings 52 may not necessarily be operational or used continuously once the water tempering system 10 has been adjusted to meet performance requirements and is fully operational and in use.

Figure 5:
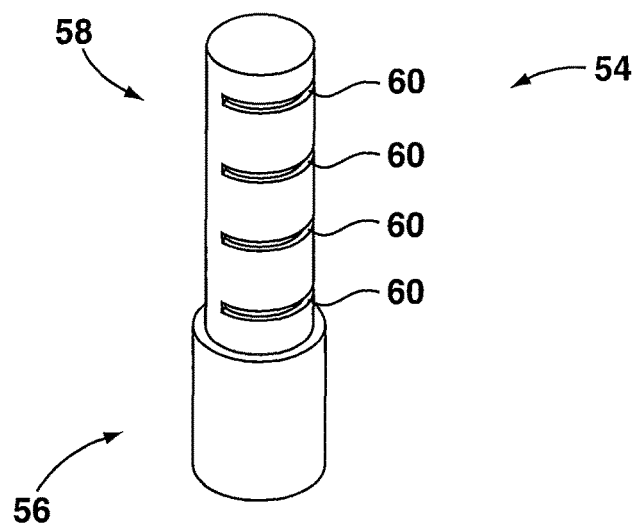
FIG. 5 is a perspective view of an injector that is incorporated into the mixing tank of the water tempering system.
Figure 6:
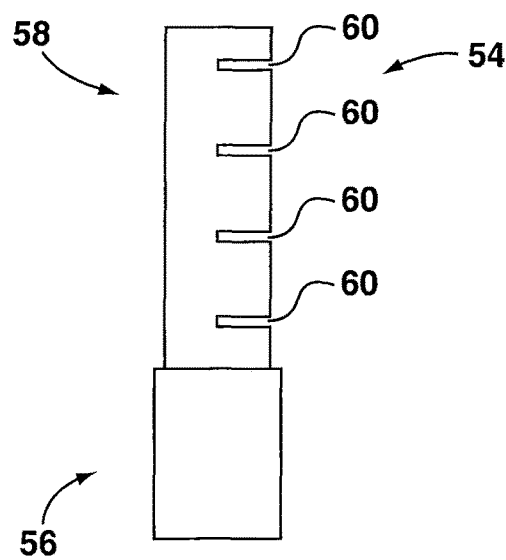
FIG. 6 is a side elevation view of the injector of FIG. 5.
Figure 7:
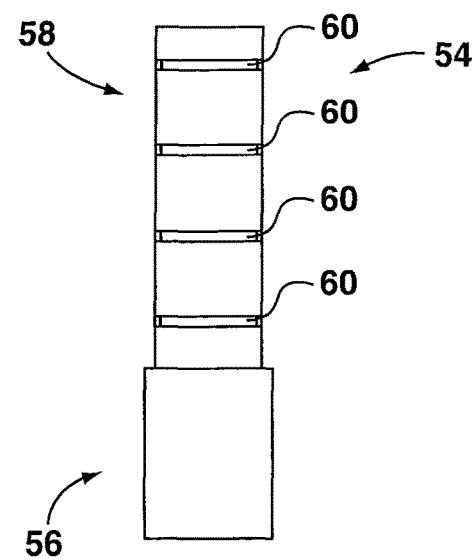
FIG. 7 is a front elevation view of the injector of FIG. 5.

The second inlet 50 of mixing tank 20 may also be provided with a length of FIP adapted for receiving an injector 54 as shown in detail in FIGS. 5-7. A flanged fitting or Victaulic® fittings may be used to connect and position the injector 54 within the second inlet 50 of the mixing tank 20. Cold water from the domestic cold water supply line 14 is directed into the mixing tank 20 through injector 54 mounted within the second inlet 50 via the first branch 14(1) of the cold water supply line 14. Injector 54 has a first end 56 (for instance a threaded end) that is secured within the opening forming second inlet 50, and a second, elongated end 58 that extends into the mixing tank 20 and is directed towards the incoming flow of domestic hot water through the first inlet 46. The second end 58 of the injector 54 is formed with a series of spaced apart slits 60 that serve to create mixing and turbulence within the fluid as it enters the mixing tank 20. The number, size and spacing of the slits 60 formed in the injector 54 can vary and/or be tailored for the specific requirements of a particular water tempering system 10 to ensure that optimal mixing of the domestic hot water and the domestic cold water occurs within mixing tank 20.

The operation of the water tempering system 10 under various operating conditions will now be described in further detail. During periods of high demand on the overall hot water distribution system of a high-rise building, the main circulation pumps (not shown) are running. The main circulation pumps serve to circulate the domestic hot water (DHW) and domestic cold water (DCW) through the various fluid lines within the overall water distribution system. As described above, water within the overall distribution system is heated by means of the one or more boilers (not shown) to the first temperature and stored in storage tank 18. Hot water at the first temperature is delivered to the mixing tank 20 through first fluid supply line 18(1) and the temperature of the hot water leaving the storage tank 18 and/or entering the mixing tank 20 is sensed by the first temperature sensor 22. In periods of high usage or high demand on the water distribution system, hot water is continuously pumped to the mixing tank 20 at a relatively high flow rate to ensure adequate supply at the outflow or discharge line 16. Cold water is also directed to the mixing tank 20 through the first branch 14(1) of the cold water supply line 14 by means of the VFD pump 32 with the VFD pump 32 operating at the upper or higher end of its operating flow range, for instance 50-100% of capacity. As greater amounts of hot water will be flowing into the mixing tank 20 in order to meet the demand for usable hot water, adequate amounts of cold water must be supplied to the mixing tank 20 to ensure that the hot water entering the mixing tank at the first temperature is tempered to the second temperature before exiting the mixing tank 20. Typically, 20-30 GPM of cold water being injected into the mixing tank 20 by means of the VFD pump 32 with the two-way control valve 34 being full-opened (i.e., valve 34 opened 100%) is sufficient to ensure that the temperature of the tempered water exiting the mixing tank 20 through the outflow line 16 is at the required second temperature to meet building or system requirements.

The temperature of the tempered hot water exiting the mixing tank 20 through the outflow line 16 is sensed by the second temperature sensor 30 to ensure that the temperature of the water meets the building code or the specific system requirements. In instances where the temperature of the tempered hot water being discharged through outflow line 16 exceeds the predetermined, second set temperature, in the subject embodiment, safety valve 40 is activated and will effectively reduced and/or shut-off the supply of hot water to the mixing tank 20 through first fluid supply line 18(1). The temperature data collected by one or more of the various temperature sensors 22, 30, 36 incorporated into the system can also be used to adjust/control the amount of cold water that is injected into the mixing tank 20 by adjusting the flow rate of the VFD pump 32 and the setting of the two-way control valve 34 to maintain the desired temperature of the water exiting the mixing tank in the outflow line 16.

During periods of low demand on the overall hot water distribution system, such as during the overnight period, the main circulation pumps that circulate the domestic hot water (DHW) and domestic cold water (DCW) through the various fluid lines within the overall water distribution system are typically shut-off or are only operating at a substantially reduced rate since the amount of water circulating through the system is significantly reduced. Instead, recirculation pump 26 is often used to circulate the water through the overall water distribution system returning water to both the domestic hot water supply and cold water supply through first fluid return line 17(1) and return line 19, and second fluid return line 17(2), respectively, the amount of flow through first fluid return line 17(1) and return line 19, and second fluid return line 17(2) being controlled by means of three-way control valve 28. Since demand for tempered hot water is low during periods of low usage, the amount of hot water being directed to mixing tank 20 through first fluid supply line 18(1) may be reduced. Therefore, the amount of cold water entering the mixing tank 20 through the first branch 14(1) of the cold water supply line 14 may also be proportionally reduced. Accordingly, during periods of low usage or low demand, an increased amount of fluid may be re-directed back to the boilers and storage tank through first fluid return line 17(1), return line 19 and the VFD pump 32 may be set to operate at a reduced flow rate at the lower end of its operating flow range and, in some instances, may even be shut-off completely allowing overall system pressure to direct domestic cold water to the mixing tank 20. It has been found that typically a flow rate of 1-3 GPM of cold water entering the mixing tank 20 is required to ensure that the temperature of the hot water exiting the mixing tank 20 through the tempered water outflow or discharge line 16 remains constant at the required, second temperature (e.g., 120-125° F.) when a reduced amount of hot water is being directed to the mixing tank 20 through first fluid supply line 18(1). Since the lowest operating flow range of VFD pumps typically exceeds the 1-3 GPM required flow rate during periods of low usage, the amount of cold water being directed to the mixing tank 20 is further limited by means of the two-way control valve 34. As well, fluid line 31 allows the tempered water exiting the mixing tank 20 to re-circulate back into the mixing tank 20 during periods of low usage to ensure that water is constantly flowing through the mixing tank 20 when both the hot water and cold water supplies to the mixing tank 20 are reduced during periods of low usage.

Figure 1A:
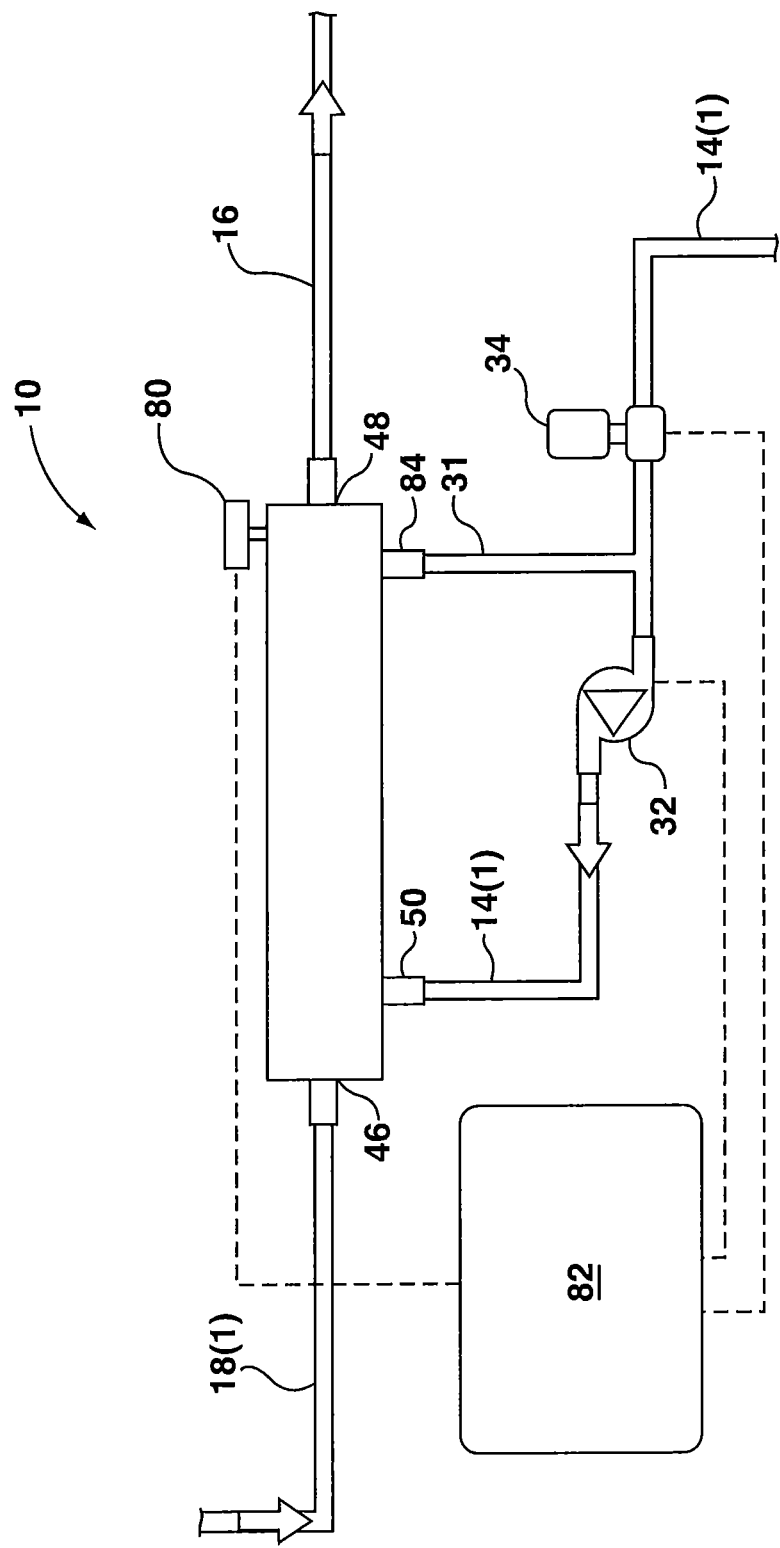
FIG. 1A is a schematic flow diagram illustrating an alternate exemplary embodiment of the water tempering system of FIG. 1.

Referring now to FIG. 1A, there is shown a variation to the water tempering system 10 of FIG. 1, wherein like reference numerals have been used to identify similar components. In the water tempering system 10 of FIG. 1A, the number of overall components and/or fluid lines incorporated into the water tempering system 10 have been reduced in an effort to simplify the overall design and functioning of the water tempering system 10 to possibly reduce overall costs (e.g., to reduce total number of components, facilitate assembly/installation, etc.) and/or facilitate installation of the water tempering system 10 into existing overall water distribution systems.

As shown in FIG. 1A, the number of temperature sensors and number of fluid lines incorporated into the water tempering system 100 have been reduced. More specifically, rather than incorporating first, second and third temperature sensors 22, 30, 36, respectively, into the hot water or first fluid supply line 18(1) entering the mixing tank 20, the tempered water outflow or third fluid supply line 16 exiting the mixing tank 20, and (optionally) the cold water of the first branch 14(1) of the cold water supply line 14 entering mixing tank 20 intermediate the VFD pump 32 and two-way control valve 34 and collecting/compiling data from all three of the individual fluid streams through temperature sensors 22, 30, 36 through the main control panel 82, a single temperature sensor 80 is instead incorporated into and mounted in conjunction with the mixing tank 20. Incorporating a single temperature sensor 80 into the mixing tank 20 simplifies the overall system since there is no need to modify existing fluid lines 14(1), 16, 18(1) (e.g., hot water supply lines, cold water supply lines and tempered water outflow lines) that already form part of the overall water distribution system of the high-rise building, for example, since the temperature data is collected from the water/fluid within the mixing tank 20, which water/fluid is the product of the mixing of the hot 18(1) and the cold 14(1) water streams. Accordingly, in the modified embodiment shown in FIG. 1A, the temperature of the tempered water, which was previously sensed in the outflow line 16, is now sensed within the mixing tank 20 just prior to it being discharged from the mixing tank 20. The data from temperature sensor 80 is sent to the main control panel 82 of the integrated control system to ensure that the hot water exiting the water tempering system 10 and being delivered to the customers (e.g., individual units/suites of a high-rise building) is at the required, predetermined second set temperature (e.g., 120° F.) or within a predetermine safe/suitable temperature range.

Additionally, rather than having fluid line 31 interconnect the tempered water outflow line 16 and the first branch 14(1) of the domestic cold water supply line 14 to re-direct fluid back into the mixing tank 20 to maintain and/or adjust the temperature of the water within the mixing tank 20 based on system requirements or on the temperature data collected by the control panel 82, fluid line 31 may instead be positioned so as to interconnect the mixing tank 20 and the first branch 14(1) of the domestic cold water supply line 14. Arranging fluid line 31 as a direct connection to the mixing tank 20 through a second fluid outlet 84 formed in the main body portion 41 of the mixing tank 20 facilitates installation of the mixing tank 20 and the water tempering system 10 into existing domestic hot water supply systems since it minimizes the number of modifications and/or additional fluid connections required to existing fluid lines by associating as many connections and/or components as possible with the mixing tank 20 itself. Additional control valves (not shown) may be incorporated into fluid line 31 to provide additional controls over the rate of fluid flow being redirected to the mixing tank 20 through fluid line 31 if deemed necessary or desirable as in the previously described embodiment.

The water tempering system 10 shown in FIG. 1A has further been simplified in order to eliminate the second fluid return line 17(2) of the recirculation line 17 interconnecting the recirculation line 17 and the first branch 14(1) of the cold water supply line 14. Since the recirculation line 17 is no longer split into two separate branches 17(1), 17(2), three-way control valve 28 is also no longer needed. By eliminating the connection between recirculation line 17 and the water tempering system 10 by way of eliminating the second branch or second fluid return line 17(2), the recirculation line 17, which generally forms part of the existing overall water supply system, does not need to be modified and/or adapted upon installation of the water tempering system 10. This lack of necessity for modification serves to facilitate installation, reduce overall costs by eliminating components and reduces the number of new potential leakage points introduced into the overall system. Additionally, by eliminating the second branch 17(2) of the recirculation line 17, the water tempering system 10 operates more independently from the existing overall water distribution system requiring connections to only the domestic hot water supply 18, domestic cold water supply 14 and tempered water outflow line 16 as opposed to also being integrated as part of the overall recirculation system.

In operation, as with the previously described embodiments, variable frequency drive pump (VFD) 32 and two-way control valve 34 control the flow of cold water to the mixing tank 20 in order to bring the temperature of the domestic hot water supply down from the first temperature (e.g., 140° F.) to the required, predetermined set second temperature (e.g., 120° F.). Provided the temperature of the water within mixing tank 20 is at the predetermined upper limit or set second temperature (e.g., 120° F.), the water tempering system 10 operates under normal operating conditions with the domestic hot water supply first fluid supply line 18(1) and domestic cold water supply 14(1) being supplied to mixing tank 20 with the VFD pump 32 running at about 20-30% with the two-way control valve 34 in its default, open position. Should the temperature of the water within the mixing tank 20 fall below the desired set second temperature, as sensed by temperature sensor 80 and main control panel 82, the two-way control valve 34 will begin to modulate closed to effectively reduce the amount of cold water being supplied to the mixing tank 20 through the first branch 14(1) of the cold water supply line 14. As the two-way control valve begins to modulate closed, the operating speed of the VFD pump 32 will increase as the amount of cold water from the cold water supply 14 is effectively reduced drawing an increased amount of fluid through recirculation line 31 in order to increase the amount of tempered water being re-circulated from the mixing tank 12 back into the mixing tank 20 in order to effectively raise the temperature of the water within mixing tank 20 so as to bring it back up to the desired, set second temperature.

Should the control system determine that the temperature of the water within mixing tank 20 exceeds the predetermined, set second temperature as sensed by the temperature sensor 80 and main control panel 82, or should the temperature sensor 80 fail or the temperature data being sent to main control panel 82 become unreliable, the main control panel 82 will display an alarm/alert condition causing the two-way control valve 34 to open completely while increasing the operating speed of the VFD pump 32 to full capacity in order to effectively flood the mixing tank 20 and/or water tempering system 10 with cold water from the first branch 14(1) of the cold water supply line 14. In the embodiment described in connection with FIG. 1, an independent safety valve 40 is incorporated into hot water supply first fluid supply line 18(1). Independent safety valve 40 activates to effectively shut-off the domestic hot water supply to the mixing tank 20 should the temperature of the tempered water in outflow line 16 exceed the predetermined second temperature, thereby acting to reduce probability of scalding, etc. However, it has been found that flooding the mixing tank 20 with cold water by opening two-way control valve 34 to 100% and increasing the operating speed of the VFD pump 32 to full capacity is also effective in bringing the temperature of the tempered water in outflow line 16 back to a safe temperature, without completely shutting off the hot water supply first fluid supply line 18(1) to the mixing tank 20. Adapting the water tempering system 10 to flood the mixing tank 20 with cold water when an alarm/alert condition arises also reduces the total number of components required, since safety shut-off valve 40 that was previously incorporated into the hot water supply first fluid supply line 18(1) is no longer required.

Figure 8:
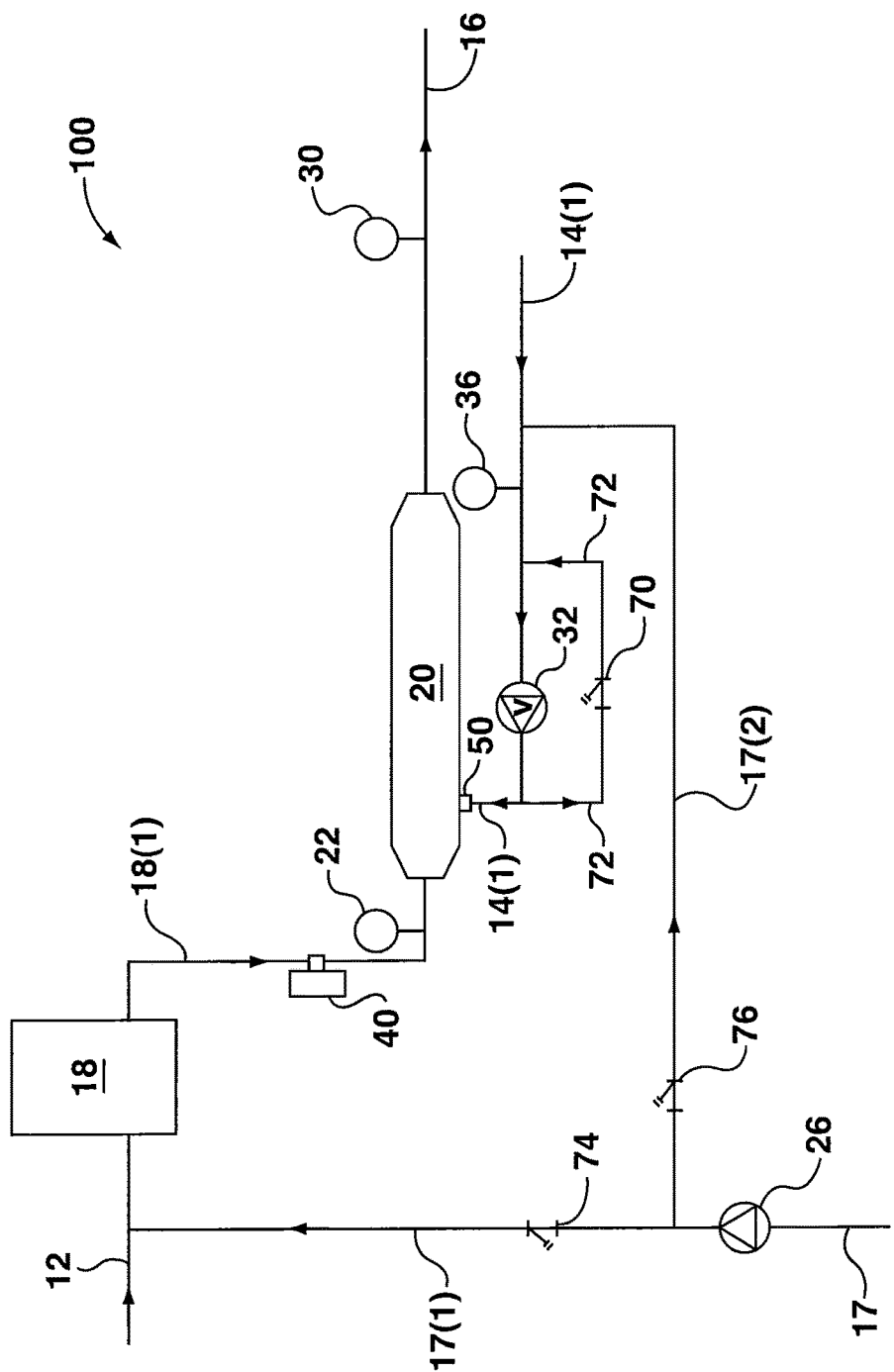
FIG. 8 is a schematic flow diagram illustrating an alternate exemplary embodiment of the water tempering system according to the present disclosure.

Referring now to FIG. 8, there is shown another exemplary embodiment of the water tempering system 100 according to the present disclosure wherein similar reference numerals have been used to denote similar components. In the subject embodiment, rather than having the VFD pump 32 arranged in series with a two-way control valve 34 for controlling the flow of cold water from the domestic cold water supply to the mixing tank 20, as is shown in FIG. 1, a bypass or balancing valve 70 is arranged in parallel with the variable frequency drive (VFD) pump 32. Accordingly, the cold water being directed to mixing tank 20 through the first branch 14(1) of the cold water supply line 14 is controlled based primarily on the operating flow rate of the VFD pump 32 (or due to the overall system pressure in instances where the VFD pump 32 may be turned off completely, for instance in periods of extremely low demand or usage). A bypass fluid line 72 is arranged in fluid communication with the portion of the first branch 14(1) of the cold water supply line 14 that directs cold water directly into the mixing tank 20 through the second inlet 50 and the portion of the first branch 14(1) of the cold water supply line 14 upstream from the VFD pump 32, the bypass or balancing valve 70 being arranged in bypass fluid line 72. The bypass valve 70 and VFD pump 32 are both operatively coupled to and controlled by the main control panel (not shown), which based on predetermined settings and/or the temperature data collected by the various temperature sensors within the system 100, adjust to determine the amount of cold water that is directed to mixing tank 20 and the amount that is diverted away from the mixing tanks and redirected through bypass fluid line 72.

As described above in connection with the embodiment shown in FIG. 1, during periods of low demand such as during the overnight period, even if the VFD pump 32 is running at the low end of its flow rate range, this flow rate may exceed the amount of cold water that is actually required in mixing tank 20 in order to bring the temperature of the hot water entering the mixing tank 20 at the first temperature to the second temperature. In such instances, bypass valve 70 will be opened an appropriate amount to allow for some of the cold water from the first branch 14(1) of the cold water supply line 14 to be directed away from the mixing tank 20 through bypass fluid line 72 and fed back into the first branch 14(1) of the cold water supply line 14 further upstream from the VFD pump 32. During periods of high demand where the VFD pump 32 is operating in the upper end of its flow rate range, bypass valve 70 may be closed or only partially opened so as to ensure that an adequate amount of cold water is directed to the mixing tank 20 through second inlet 50 to ensure proper tempering of the hot water entering the mixing tank 20 at the first temperature to the second temperature before exiting the mixing tank 20 through fluid line 16.

As well, as shown in FIG. 8, rather than having the recirculation pump 26 mounted in series with a three-way control valve 28 at the junction of fluid lines 17, 17(1), 17(2), two separate bypass or control valves 74, 76 are mounted, respectively, in fluid lines 17(1) and 17(2) in order to control the amount of flow that is directed or re-circulated through the system 100 back to the boilers (not shown) for heating before being returned to storage tank 18 through first fluid return line 17(1) or that is directed back into the first branch 14(1) of the cold water supply line 14.

Figure 9:
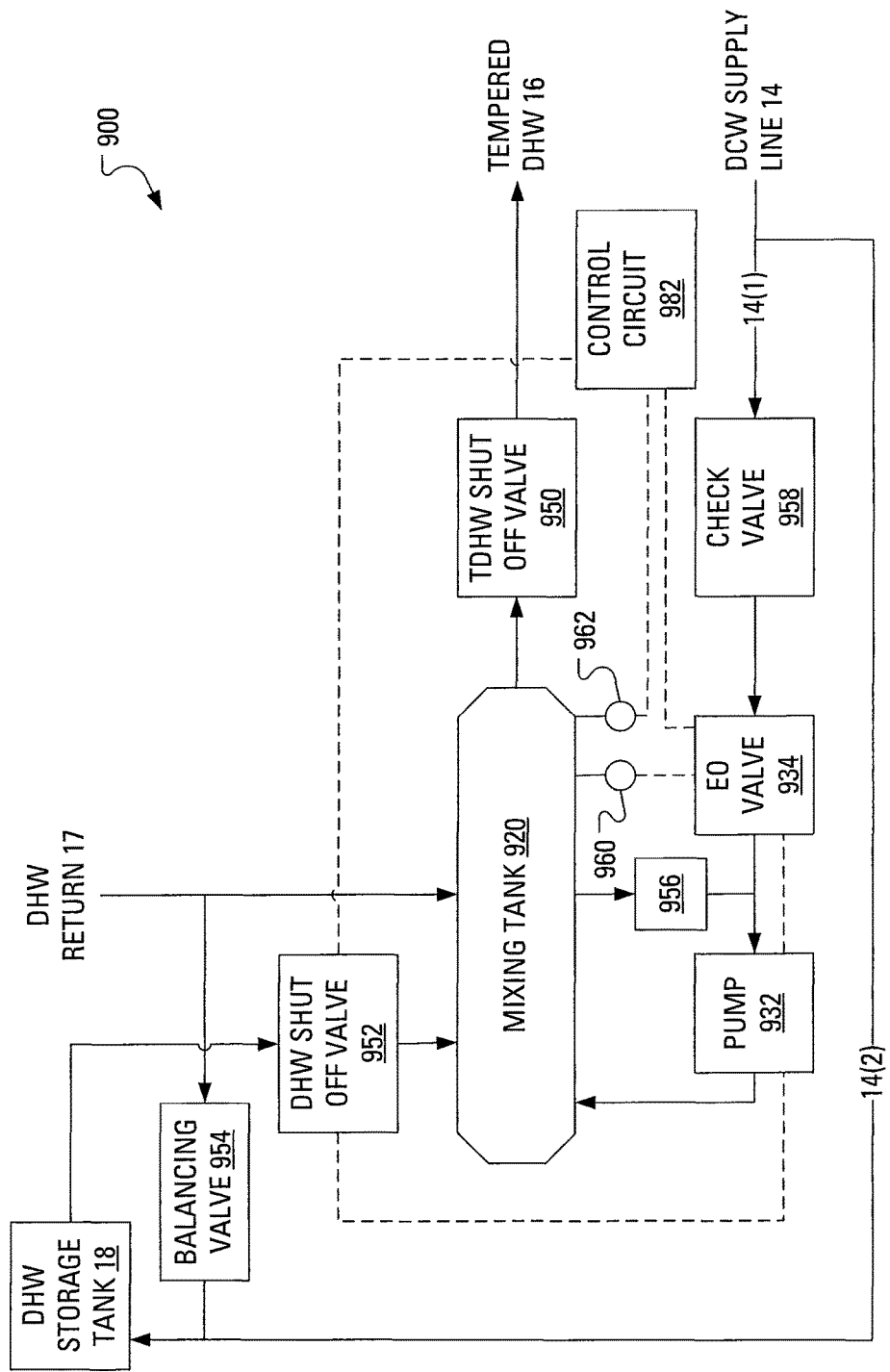
FIG. 9 illustrates, in a schematic flow diagram, a further alternate exemplary embodiment of a water tempering system including a mixing tank according to aspects of the present disclosure.

FIG. 9 illustrates, in a schematic flow diagram, a further alternate embodiment of a water tempering system 900 according to aspects of the present disclosure. In operation, domestic hot water leaves from the storage tank 18 at a first temperature (e.g., 140° F.) and passes through a first fluid supply line. A first branch of the first fluid supply line leads the domestic hot water towards a mixing tank 920 via a DWH shut off valve 952. Domestic cold water (DCW) is delivered to the water tempering system 900 from the cold water supply line 14. From the cold water supply line 14 there is a first branch 14(1) that directs cold water toward the mixing tank 920 and a second branch 14(2) that is fluidly connected to an inlet on the storage tank 18.

In the subject embodiment, the recirculation line 17 directs re-circulated or spent water to the mixing tank 920. A portion of the re-circulated water, (e.g., between 1 and 3 gallons per minute) may be diverted to the inlet of storage tank 18 under control of a balancing valve 954. The balancing valve 954 may, for example, be manual or automated. It may be shown that, in operation during times of very low demand for the tempered domestic hot water output from the system 900, the combination, received at the mixing tank 920, of DCW from the pump 932, DHW from the storage tank 18 and re-circulated water will eventually lead to a cooling of the water in circulation. Such cooling may be attributed to heat loss in the building's distribution and circulation loop. Diversion, under control of the balancing valve 954, of a portion of the re-circulated water may be seen to allow the system to maintain a relatively static temperature during such low demand times.

An adjustment, under control of the balancing valve 954, of more or less volume into the DHW storage tank 18 allows for control of the temperature up or down during no demand periods. Suitable valves for use as the balancing valve 954 include the Energy Valve marketed by Belimo Holding AG of Hinwil, Switzerland. Suitable valves for use as the balancing valve 954 also include standard circuit balancing valves and other valves that may achieve the same result.

Tempered domestic hot water (TDHW) leaves the mixing tank 920 and passes through a TDHW shut off valve 950. After the TDHW shut off valve 950, the tempered domestic hot water outflow is then directed to the individual suites or units for use by a user. The temperature of the tempered domestic hot water leaving the mixing tank 920 is sensed, while still in the mixing tank 920, by a first temperature sensor 960 and a second temperature sensor 962. The second temperature sensor 962 monitors the temperature of the TDHW to ensure that the TDHW is in a temperature range identified as being safe usage within the building or overall system. For example, the temperature range may be 120-125° Fahrenheit. The temperature data from the second temperature sensor 962 is sent to a control circuit 982. The control circuit 982 may use the temperature data to operably adjust the water tempering system 900, to maintain appropriate functioning of the system to deliver tempered domestic hot water at a safe, usable temperature.

To bring the temperature of the DHW entering the mixing tank 920 down from a first, storage tank, temperature (e.g., approximately 140° F.) to a second, lower temperature (e.g., 120-125° F.) as TDHW exits or leaves the mixing tank 920, domestic cold water is directed into the mixing tank 920 through the first branch 14(1) of the cold water supply line 14. The amount of flow through the first branch 14(1) of the cold water supply line 14 into the mixing tank 20 is controlled by a pump 932 and an electronically operated (EO) valve 934 based on temperature data collected associated with at least the temperature of the water in mixing tank 920. The domestic cold water arrives at the EO valve 934 via a check valve 958.

Notably, the pump 932 may be implemented as a variable rate pump or a fixed rate pump. Suitable valves for use as the EO valve 934 include the Energy Valve marketed by Belimo Holding AG of Hinwil, Switzerland. However, the software included in an off-the-shelf version of the Belimo Energy Valve may be altered to accommodate various aspects of the present application.

The mixing tank 920 includes a first inlet for receiving DHW from the DHW storage tank 18 via the DWH shut off valve 952. The mixing tank 920 also includes a second inlet for receiving DCW from the DCW supply line 14 via the check valve 958, the EO valve 934 and the pump 932. The mixing tank 920 further includes a first outlet for discharging TDHW from the mixing tank 920 and delivering TDHW 16 via the TDHW shut off valve 950. The mixing tank 920 even further includes a recirculation inlet for receiving returned fluid via the recirculation line 17.

The domestic cold water that is directed into the mixing tank 920 through the first branch 14(1) of the cold water supply line 14 serves to temper, or cool, the domestic hot water entering the mixing tank 920 to bring the temperature of the DHW from the first, higher temperature (e.g., 140° Fahrenheit) to the second, lower temperature (e.g., 120° Fahrenheit) so that the water can be safely discharged from the mixing tank 920 through the outflow or third water supply line 16.

As shown in FIG. 9, the water tempering system 900 further comprises a fluid line that interconnects tempered water from the mixing tank 920 to the domestic cold water of the first branch 14(1) of the cold water supply line 14 intermediate the EO valve 934 and the pump 932. The referenced fluid line serves to re-circulate or re-direct tempered water from the mixing tank 920 back into the mixing tank 920 through the first branch 14(1) of the cold water supply line 14 to maintain or adjust the temperature of the water within the mixing tank 920 based on system requirements or based on temperature data collected by one or more of the various temperature sensors 960, 962.

A restricting orifice 956 or other means of reducing line diameter is located in between the mixing tank 920 and the line connecting the pump 932 intake side to the outlet of the EO valve 934. The restricting orifice 956 may be seen to provide a bias, creating negative pressure on the intake side of the pump 932, thereby encouraging the correct direction of DCW flow without regard to whether the EO valve 934 is either open or closed.

The mixing tank 920 may include a blending insert 1100 (see FIGS. 11A and 11B) to establish a turbulent flow within the mixing tank 920, thereby encouraging blending of hot and cold streams. In one embodiment, the blending insert 1100 is fashioned from stainless steel, thereby remaining in compliance with National Sanitation Foundation (NSF) laws pertaining to lead in potable water. The blending insert 1100 is illustrated in FIGS. 11A and 11B as being formed as a hollow cylindrical body 1102 with a plurality of fins 1104 extending radially from an outer surface of the cylindrical body 1102. Associated with each of the fins 1104 are similarly sized and shaped apertures in the cylindrical body 1102. Each end of the cylindrical body 1102 includes a plurality of positioning pins 1106 extending radially from the outer surface of the cylindrical body 1102.

In the water tempering system 10 of FIG. 1, control for the water tempering system 10 is provided by the main control panel 82. In contrast, control for the water tempering system 900 of FIG. 9 is provided by the control circuit 982. The control circuit 982 may be incorporated in the EO valve 934. The EO valve 934 provides all the necessary controls for the pump 932, temperature monitoring and DCW injection. The control circuit 982 may further be provided with interfaces to connect the water tempering system 900 to a remote monitoring system, an energy management system and/or a data storage and retrieval device. The EO valve 934 may incorporate both a flow meter (not shown) and a metering device (not shown) to regulate the injection of DCW.

The combination of the control circuit 982, the mixing tank 920, the EO valve 934 and the pump 932 may be seen to provide means to sense needs for TDHW based on demand and based on time-of-day inputs. Such sensing may be seen to allow the system 900 to lower the temperature of the TDHW 16 during periods of low demand, thereby conserving energy.

The DHW shut off valve 952 may be implemented using an actuator, from, for example, Belimo Holding AG of Hinwil, Switzerland, and a two-way ball valve. The DHW shut off valve 952 may be seen to provide an added layer of safety. When the temperature in the mixing tank 920 is greater than a preset high limit, or when there is a power failure, the DHW shut off valve 952 may be activated to shut off hot water to the mixing tank 920. Such closing may be accomplished through closure of the two-way ball valve. The actuator may be arranged to reset to an open position once power becomes available or once the temperature in the system is below the preset high limit. After three consecutive activations, there may be a policy that requires the DHW shut off valve 952 to be reset manually, to allow the two-way ball valve to be opened again.

Figure 10:
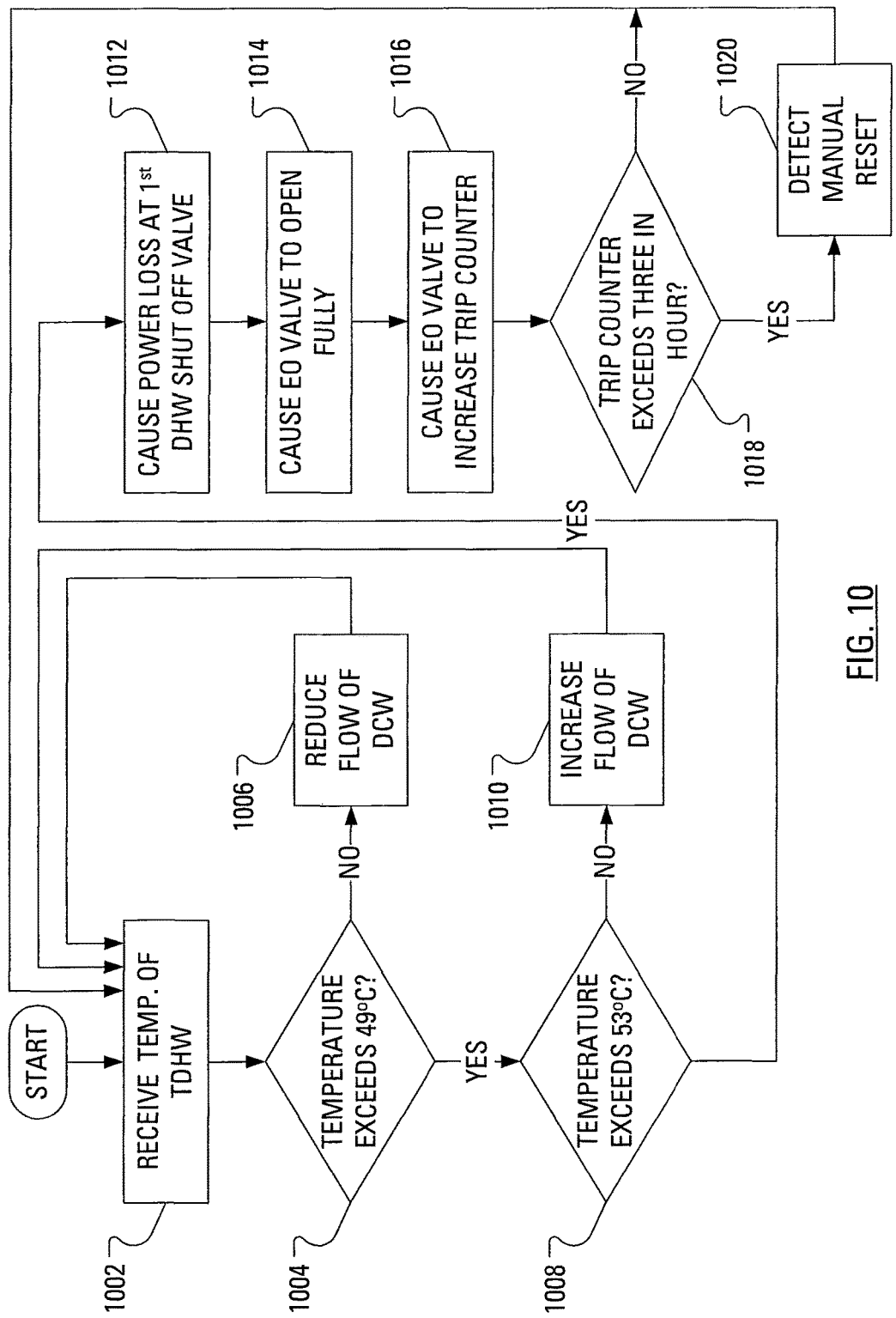
FIG. 10 illustrates example steps in a method of controlling a safety feature of the water tempering system of FIG. 9.

Operation of the control circuit 982 may be considered in view of the example steps of the method illustrated in FIG. 10. Indeed, the method illustrated in FIG. 10 may be considered to be a safety feature of the water tempering system of FIG. 9. Upon receiving (step 1002), from the second temperature sensor 962, temperature data providing an indication of the temperature of the TDHW exiting the mixing tank 920, the control circuit 982 may analyze the temperature data. Analyzing the temperature data may involve the control circuit 982 determining (step 1004) whether the temperature exceeds 49° C.

Responsive to determining (step 1004) that the temperature does not exceed 49° C., the control circuit 982 may act to reduce (step 1006) the flow rate of the DCW 14 by controlling operation of the EO valve 934 and the pump 932. Reducing (step 1006) the flow rate of the DCW 14 may, for example, involve reducing the flow allowed through the EO valve 934 and reducing the flow as controlled by the pump 932. The control circuit 982 may then return to receiving (step 1002), from the second temperature sensor 962, an indication of the temperature of the TDHW exiting the mixing tank 920. It follows that a reduced flow of cold water into the mixing tank 920 will allow the temperature of the TDHW 16 to rise.

Responsive to determining (step 1004) that the temperature exceeds 49° C., analyzing the temperature data may further involve the control circuit 982 determining (step 1008) whether the temperature exceeds 53° C.

Responsive to determining (step 1008) that the temperature does not exceed 53° C., the control circuit 982 may act to increase (step 1010) the flow rate of the DCW 14 by controlling operation of the EO valve 934 and the pump 932. Increasing (step 1010) the flow rate of the DCW 14 may, for example, involve increasing the flow allowed through the EO valve 934 and increasing the flow as controlled by the pump 932. The control circuit 982 may then return to receiving (step 1002), from the second temperature sensor 962, an indication of the temperature of the TDHW exiting the mixing tank 920. It follows that an increased flow of cold water into the mixing tank 920 will allow the temperature of the TDHW 16 to fall.

As a safety measure, responsive to determining (step 1008) that the temperature exceeds 53° C., the control circuit 982 may record a "trip" and, consequently, take several actions. One action involves the control circuit 982 causing (step 1012) the DWH shut off valve 952 to lose power. Another action involves the control circuit 982 causing (step 1014) the EO valve 934 to open fully. A further action involves the control circuit 982 causing (step 1016) the EO valve 934 to increment a trip counter.

The control circuit 982 may then determine (step 1018) whether the trip counter has exceeded a threshold. The threshold may, for example, be time-based such that older trips are removed from the counter periodically. In one implementation, the determining (step 1018) involves determining whether a trip has occurred more than three times in the last hour.

Upon determining (step 1018) that the trip counter has not exceeded the threshold, the control circuit 982 may simply return to receiving (step 1002), from the second temperature sensor 962, an indication of the temperature of the TDHW exiting the mixing tank 920.

Upon determining (step 1018) that the trip counter has exceeded the threshold, the control circuit 982 may await receipt (step 1020) of an indication that the DWH shut off valve 952 has been manually reset. The control circuit 982 may then return to receiving (step 1002), from the second temperature sensor 962, an indication of the temperature of the TDHW exiting the mixing tank 920.

While various components of water tempering systems 10, 100 have been described in connection with the exemplary embodiments described above, it will be understood that the water tempering system 10, 100 may comprise additional components, such as additional check valves, pressure sensors and/or temperature sensors mounted within any of the fluid lines within the system in order to control/monitor the flow and to ensure proper functioning of the water tempering system 10, 100.

By bringing the domestic hot water and domestic cold water supplies together in the mixing tank 20 to create a source of tempered hot water at the required second temperature greatly decreases the risk of scalding caused by hot water being delivered through the outflow line 16 to individual suites or units at a temperature that exceeds the predetermined, safe temperature since the mixing tank 20 provides ample space for the two streams of water (i.e., the domestic hot water at the first temperature and the domestic cold water) to thoroughly mix before being discharged through the outflow line 16. As well, by having the domestic cold water supply directed to the mixing tank 20 by means of a variable frequency drive (VFD) pump in combination with a two-way control valve 34, either in series or in parallel, the overall water tempering system 10, 100 is more robust since variable frequency drive pumps are more adaptable to various flow rates and are less likely to fail than typical anti-scalding mixing valves. As discussed hereinbefore, typical anti-scalding mixing valves require a minimum flow rate that greatly exceeds the flow rates within the system during periods of low demand and, therefore, do not function efficiently during these periods. Furthermore, variable frequency drive pumps 32 are also less prone to calcium build-up, which often leads to premature failure of the typical anti-scalding mixing valves. Accordingly, the combination of a variable frequency drive pump 32 and two-way control valve 34 in combination with a mixing tank 20 to create a source of tempered water that is discharged through outflow line 16 and directed for use in the individual suites or units within a high-rise building offers a more efficient and more robust water tempering system 10, 100 for reliably providing hot water to users at a safe and usable temperature.

While various exemplary embodiments have been described and shown in the drawings, it will be understood that certain adaptations and modifications of the described exemplary embodiments can be made as construed within the scope of the present disclosure. Therefore, the above discussed embodiments are considered to be illustrative and not restrictive.

What is claimed is:
1. A water tempering system comprising:
   a mixing tank having:
      a first inlet for receiving fluid from a first water supply line at a first temperature;
      a second inlet for receiving fluid from a second water supply line;
      a first outlet for discharging fluid from said mixing tank and delivering said fluid via a third water supply line at a second temperature; and
      a recirculation inlet for receiving fluid from a fourth water supply line, said fourth water supply line providing fluid formerly discharged from said mixing tank;
   a pump fluidly coupled to said second inlet for controlling the flow of fluid from said second water supply line to said mixing tank through said second inlet;
   an electrically operated valve arranged in fluid communication with said pump for controlling flow to said pump; and
   a control system adapted to:
      receive temperature data associated with said fluid in said mixing tank;
      analyze said temperature data; and
      based on said analyzing:
         transmit instructions to said pump causing said pump to alter a flow rate of said fluid from said second water supply line into said second inlet; and
         transmit instructions to said electrically operated valve causing said electrically operated valve to alter the flow rate of said fluid from said second water supply line into said second inlet.

2. The water tempering system as claimed in claim 1 further comprising a shut off valve coupled to said first inlet for controlling the flow of fluid from said first water supply line to said mixing tank through said first inlet.

3. The water tempering system as claimed in claim 2 wherein the control system is further adapted to cause, based on said analyzing, said shut off valve to lose power.

4. The water tempering system as claimed in claim 1 further comprising a temperature sensor mounted in conjunction with said mixing tank for sensing the temperature of the fluid within said mixing tank prior to discharge from said mixing tank through said first outlet and third water supply line.

5. The water tempering system as claimed in claim 4 wherein said receiving said temperature data comprises receiving said temperature data from said temperature sensor.

6. The water tempering system as claimed in claim 1, wherein said shut off valve comprises an actuator and a two-way control valve.

7. The water tempering system as claimed in claim 1, wherein said mixing tank further comprises a second outlet; and
wherein a recirculation line interconnects said second outlet and said second inlet via said pump, the recirculation line being arranged intermediate said electronically operated valve and said pump for re-directing fluid from said mixing tank back into said mixing tank via said second inlet.

8. The water tempering system as claimed in claim 7, further comprising a means of reducing line diameter located in between the mixing tank and the line connecting the pump to the outlet of the electrically operated valve.

9. The water tempering system as claimed in claim 8 wherein said means of reducing line diameter comprises a restricting orifice.

10. The water tempering system as claimed in claim 1, wherein said first temperature is 140° Fahrenheit and said predetermined second temperature is 120-125° Fahrenheit.

11. The water tempering system as claimed in claim 1, wherein said second inlet is located downstream from and proximal to the first inlet.

12. The water tempering system as claimed in claim 1, further comprising a blending insert mounted within the mixing tank for establishing a turbulent flow between the domestic hot water supply entering the mixing tank through said first inlet and the domestic cold water supply entering the mixing tank through said and second inlet.

13. The water tempering system as claimed in claim 1, further comprising a second outlet arranged upstream from and proximal to said first outlet.

14. The water tempering system as claimed in claim 1, wherein the mixing tank further comprises a plurality of temperature sensors and/or pressure sensors in fluid communication with the interior of said mixing tank.

15. The water tempering system as claimed in claim 1, wherein said water tempering system is incorporated into a hot water distribution system having a storage tank for storing hot water, the water tempering system further comprising a balancing valve configured to divert, to said storage tank, a portion of said fluid formerly discharged from said mixing tank.

* * * * *